United States Patent
Kimoto

(10) Patent No.: US 8,761,980 B2
(45) Date of Patent: Jun. 24, 2014

(54) START SUPPORT APPARATUS FOR ELECTROMOTIVE VEHICLE

(75) Inventor: Yu Kimoto, Anjo (JP)

(73) Assignee: Denso Corporation, Kariya (JP)

( * ) Notice: Subject to any disclaimer, the term of this patent is extended or adjusted under 35 U.S.C. 154(b) by 161 days.

(21) Appl. No.: 13/253,279

(22) Filed: Oct. 5, 2011

(65) Prior Publication Data

US 2012/0095632 A1    Apr. 19, 2012

(30) Foreign Application Priority Data

Oct. 19, 2010    (JP) ................. 2010-234695

(51) Int. Cl.
| | |
|---|---|
| G06F 17/00 | (2006.01) |
| G06F 19/00 | (2011.01) |
| B60L 15/00 | (2006.01) |
| H02P 31/00 | (2006.01) |
| B60K 37/00 | (2006.01) |
| B60K 6/00 | (2006.01) |

(52) U.S. Cl.
USPC ......... 701/22; 701/99; 180/65.21; 180/65.31; 180/90; 180/315

(58) Field of Classification Search
USPC ........... 701/22, 51–61, 64–69, 70, 82, 84–88, 701/90, 94–95, 99, 116, 33.7–34.1; 180/65.21, 65.31, 90, 315
See application file for complete search history.

(56) References Cited

U.S. PATENT DOCUMENTS

| | | | | | |
|---|---|---|---|---|---|
| 4,623,870 | A | * | 11/1986 | Irimajiri et al. | 340/439 |
| 4,936,405 | A | * | 6/1990 | Hrovat | 180/197 |
| 5,020,622 | A | * | 6/1991 | Hrovat | 180/197 |
| 5,215,159 | A | * | 6/1993 | Nishida | 180/179 |
| 5,303,794 | A | * | 4/1994 | Hrovat et al. | 180/197 |
| 5,309,139 | A | * | 5/1994 | Austin | 340/462 |
| 5,534,759 | A | * | 7/1996 | Evans et al. | 318/139 |
| 5,539,643 | A | * | 7/1996 | Yamamoto et al. | 701/85 |
| 5,568,024 | A | * | 10/1996 | Suzuki | 318/139 |
| 6,041,276 | A | * | 3/2000 | John et al. | 701/67 |
| 6,146,308 | A | * | 11/2000 | Taniguchi et al. | 477/48 |
| 6,174,261 | B1 | * | 1/2001 | Watanabe et al. | 477/43 |

(Continued)

FOREIGN PATENT DOCUMENTS

| | | |
|---|---|---|
| JP | 04-145599 | 5/1992 |
| JP | 07-315078 | 12/1995 |

(Continued)

OTHER PUBLICATIONS

Japanese Official Action dated Oct. 23, 2012 issued in corresponding Japanese Application No. 2010-234695, with English translation.

*Primary Examiner* — Fadey Jabr
*Assistant Examiner* — Allen E Quillen
(74) *Attorney, Agent, or Firm* — Nixon & Vanderhye PC

(57) ABSTRACT

A start support apparatus to be disposed in an electromotive vehicle includes a requested driving force calculation portion, the startable driving force calculation portion, and an indication portion. The requested driving force calculation portion calculates a requested driving force that is generated at a motor based on operation by a driver of the electromotive vehicle. The startable driving force calculation portion calculates a startable driving force that is required to be generated at the motor for starting the electromotive vehicle. The indication portion shows a degree of gap between the requested driving force and the startable driving force.

19 Claims, 5 Drawing Sheets

(56) References Cited

U.S. PATENT DOCUMENTS

| | | | |
|---|---|---|---|
| 6,253,144 B1* | 6/2001 | Yamamura et al. | 701/96 |
| 6,312,357 B1* | 11/2001 | Sakai et al. | 477/37 |
| 6,459,980 B1* | 10/2002 | Tabata et al. | 701/70 |
| 6,494,282 B1* | 12/2002 | Hessmert et al. | 180/197 |
| 6,512,967 B2* | 1/2003 | Ostberg et al. | 701/22 |
| 6,522,148 B2* | 2/2003 | Ochiai et al. | 324/428 |
| 6,549,840 B1* | 4/2003 | Mikami et al. | 701/69 |
| 6,641,502 B2* | 11/2003 | Heim | 477/37 |
| 6,656,085 B2* | 12/2003 | Schmitt | 477/83 |
| 6,676,561 B2* | 1/2004 | Fritzer et al. | 477/70 |
| 6,679,807 B2* | 1/2004 | Kato et al. | 477/107 |
| 6,719,076 B1* | 4/2004 | Tabata et al. | 180/65.7 |
| 6,826,469 B2* | 11/2004 | Iwata et al. | 701/93 |
| 6,837,323 B2* | 1/2005 | Denton et al. | 180/65.26 |
| 6,898,505 B2* | 5/2005 | Kadota et al. | 701/71 |
| 7,035,727 B2* | 4/2006 | De La Salle et al. | 701/93 |
| 7,041,031 B2* | 5/2006 | Wheeler et al. | 477/110 |
| 7,099,762 B2* | 8/2006 | Graf et al. | 701/54 |
| 7,152,707 B2* | 12/2006 | Matsuda | 180/243 |
| 7,234,339 B2* | 6/2007 | Kogure | 73/9 |
| 7,324,878 B2* | 1/2008 | Imai et al. | 701/1 |
| 7,496,435 B2* | 2/2009 | Iwatsuki et al. | 701/22 |
| 7,502,680 B2* | 3/2009 | Schmitt | 701/84 |
| 7,503,233 B2* | 3/2009 | Shishido et al. | 74/339 |
| 7,523,797 B2* | 4/2009 | Kimura et al. | 180/65.25 |
| 7,561,954 B2* | 7/2009 | Aizawa et al. | 701/79 |
| 7,710,252 B2* | 5/2010 | Kaya | 340/459 |
| 7,742,865 B2* | 6/2010 | Masuda et al. | 701/99 |
| 7,747,374 B2* | 6/2010 | Masuda et al. | 701/99 |
| 7,772,970 B2* | 8/2010 | Masuda et al. | 340/439 |
| 7,833,127 B2* | 11/2010 | Petzold et al. | 477/97 |
| 7,921,945 B2* | 4/2011 | Harris | 180/65.285 |
| 7,921,950 B2* | 4/2011 | Harris | 180/65.6 |
| 7,983,826 B2* | 7/2011 | Kuwahara et al. | 701/54 |
| 8,019,524 B2* | 9/2011 | Oishi et al. | 701/102 |
| 8,060,268 B2* | 11/2011 | Hasegawa et al. | 701/22 |
| 8,123,659 B2* | 2/2012 | Leibbrandt et al. | 477/175 |
| 8,126,625 B2* | 2/2012 | Makino et al. | 701/65 |
| 8,157,035 B2* | 4/2012 | Whitney et al. | 180/65.265 |
| 8,224,539 B2* | 7/2012 | Heap | 701/54 |
| 8,352,150 B2* | 1/2013 | Hijikata | 701/102 |
| 8,406,973 B2* | 3/2013 | Masuda et al. | 701/56 |
| 8,515,632 B2* | 8/2013 | Otake | 701/54 |
| 2004/0040758 A1* | 3/2004 | Shimizu | 180/65.2 |
| 2004/0143383 A1* | 7/2004 | Kuepper et al. | 701/51 |
| 2005/0017580 A1* | 1/2005 | Cikanek et al. | 303/191 |
| 2005/0131587 A1* | 6/2005 | Takamatsu | 701/1 |
| 2005/0137766 A1* | 6/2005 | Miyakoshi et al. | 701/36 |
| 2005/0170933 A1* | 8/2005 | Eriksson et al. | 477/180 |
| 2005/0278079 A1* | 12/2005 | Maguire | 701/1 |
| 2007/0029121 A1* | 2/2007 | Saitou et al. | 180/65.2 |
| 2007/0056784 A1* | 3/2007 | Joe et al. | 180/65.2 |
| 2007/0100512 A1* | 5/2007 | Funk | 701/1 |
| 2007/0227791 A1* | 10/2007 | Ueno | 180/65.2 |
| 2007/0257783 A1* | 11/2007 | Matsumoto et al. | 340/425.5 |
| 2009/0125173 A1* | 5/2009 | Komatsu et al. | 701/22 |
| 2009/0322503 A1* | 12/2009 | Suzuki et al. | 340/438 |
| 2010/0114438 A1* | 5/2010 | Makino et al. | 701/48 |
| 2010/0235043 A1* | 9/2010 | Seta et al. | 701/34 |
| 2010/0274460 A1* | 10/2010 | Kuwahara et al. | 701/99 |
| 2011/0118921 A1* | 5/2011 | Park et al. | 701/22 |
| 2011/0125357 A1* | 5/2011 | Harumoto et al. | 701/22 |
| 2011/0137514 A1* | 6/2011 | Itabashi | 701/29 |
| 2011/0139117 A1* | 6/2011 | Kar et al. | 123/395 |
| 2011/0260889 A1* | 10/2011 | Hill | 340/945 |
| 2011/0288732 A1* | 11/2011 | Kuwahara et al. | 701/54 |
| 2011/0313628 A1* | 12/2011 | Chinbe et al. | 701/54 |
| 2011/0320075 A1* | 12/2011 | Kim et al. | 701/22 |
| 2012/0022756 A1* | 1/2012 | Ueno et al. | 701/58 |
| 2012/0035818 A1* | 2/2012 | Takanami et al. | 701/54 |
| 2012/0059561 A1* | 3/2012 | Niwa et al. | 701/54 |
| 2012/0072064 A1* | 3/2012 | Kumazaki et al. | 701/22 |
| 2012/0072065 A1* | 3/2012 | Minamikawa et al. | 701/22 |
| 2012/0078455 A1* | 3/2012 | Chrostowski et al. | 701/22 |
| 2012/0095632 A1* | 4/2012 | Kimoto | 701/22 |
| 2012/0115057 A1* | 5/2012 | Yoshida | 429/430 |
| 2012/0249061 A1* | 10/2012 | Watanabe | 320/107 |
| 2012/0252628 A1* | 10/2012 | Tsutsumi et al. | 477/19 |
| 2012/0303199 A1* | 11/2012 | Oba et al. | 701/22 |
| 2012/0323425 A1* | 12/2012 | Suyama et al. | 701/22 |
| 2013/0030624 A1* | 1/2013 | Suyama et al. | 701/22 |
| 2013/0030675 A1* | 1/2013 | Minase et al. | 701/110 |
| 2013/0072350 A1* | 3/2013 | Ueno et al. | 477/111 |
| 2013/0079966 A1* | 3/2013 | Terakawa et al. | 701/22 |
| 2013/0090798 A1* | 4/2013 | Fukushiro | 701/22 |

FOREIGN PATENT DOCUMENTS

| | | | |
|---|---|---|---|
| JP | 10-129298 | 5/1998 | |
| JP | 11-288291 | 10/1999 | |
| JP | 2001-282263 | 10/2001 | |
| JP | 2005-31606 | 2/2005 | |
| JP | 2005-128262 | 5/2005 | |
| JP | 2006-199110 | 8/2006 | |
| JP | 2006-302106 | 11/2006 | |
| JP | 2007-125921 | 5/2007 | |
| JP | WO 2010/067154 * | 6/2010 | B60Q 1/00 |
| JP | 2012090425 A * | 5/2012 | |

* cited by examiner

START SUPPORT APPARATUS FOR ELECTROMOTIVE VEHICLE

CROSS REFERENCE TO RELATED APPLICATIONS

The present application is based on and claims priority to Japanese Patent Application No. 2010-234695 filed on Oct. 19, 2010, the contents of which are incorporated in their entirety herein by reference.

TECHNICAL FIELD

The present invention relates to a start support apparatus for an electromotive vehicle.

BACKGROUND

Vehicles include: (i) engine vehicles that use an engine as a travel driving source and (ii) electromotive vehicles that use an electric motor as a travel driving source. The electromotive vehicles include electric vehicles (EV) and hybrid electric vehicles (HEV).

A driver of an engine vehicle may sense a driving force of the vehicle from an engine sound in addition to an engine speed value indicated by a tachometer. Thus, the driver sensuously determines a time when a driving force corresponding to various kinds of starts are generated and starts the vehicle. The various kinds of start include, for example, a slow start, a backward start, and an uneven-surface start.

In the electromotive vehicle, a power meter that indicates the amount of power output to the motor is provided instead of a tachometer. However, because the motor is silent, it is difficult for a driver to aurally sense the driving force of the vehicle and to sensuously determine a time when a driving force corresponding to various kinds of starts are generated. Thus, the driver cannot sensuously determine how much driving force to be generated for starting the electromotive vehicle, and the driver may feel anxious.

Techniques for generating an imitative sound so that a driver of an electromotive vehicle can aurally sense a driving force of the vehicle are suggested. For example, JP-A-2005-31606 discloses a technique that plays an imitative sound of an engine sound in conjunction with driving of a vehicle. JP-A-11-288291 discloses a technique that plays an imitative sound of an engine sound in accordance with a rotation amount of a motor in an electric vehicle. JP-A-2001-283363 discloses a technique that generates an exhaust sound of an engine in accordance with a rotation amount of a tachometer or an amount of accelerator pedal operation in a hybrid electric vehicle.

However, even when the imitative sound of the engine sound is generated in accordance with driving of the vehicle as described above, a driver who is unfamiliar with an electromotive vehicle that generates the imitative sound of the engine sound may not judge how much sound volume of the imitative sound corresponds to an amount of driving force. Thus, even if the imitative sound of the engine sound is generated in accordance with driving, there is a possibility that the driver cannot sensuously determine how much driving force should be generated for starting the electromotive vehicle and the driver feels anxious.

Because a driver takes time to empirically learn how much sound volume of the imitative sound corresponds to an amount of driving force, the feeling of anxiety cannot be relieved easily.

SUMMARY

In view of the foregoing problems, it is an object of the present invention to provide a start support apparatus that can easily relieve a feeling of anxiety of a driver at starting an electromotive vehicle.

According to a first aspect of the present invention, a start support apparatus to be disposed in an electromotive vehicle that uses a motor as a travel driving source includes a requested driving force calculation portion, a startable driving force calculation portion, and an indication portion. The requested driving force calculation portion calculates a requested driving force that is generated at the motor based on operation by a driver of the electromotive vehicle. The startable driving force calculation portion calculates a startable driving force that is required to be generated at the motor for starting the electromotive vehicle. The indication portion shows a degree of gap between the requested driving force and the startable driving force.

Because the start support apparatus according to the first aspect indicates the degree of gap between the requested driving force and the startable driving force, even a driver who is unfamiliar with an electromotive vehicle can easily determine how much driving force needs to be generated for starting the electromotive vehicle. Thus, the start support apparatus can relieve a feeling of anxiety of the driver at starting the electromotive vehicle.

According to a second aspect of the present invention, a start support apparatus to be disposed in an electromotive vehicle that uses a motor as a travel driving source includes a requested driving force calculation portion, a startable driving force calculation portion, a requested driving force determination portion, and a driving force adjustment portion. The requested driving force calculation portion calculates a requested driving force that is generated at the motor based on operation by a driver of the electromotive vehicle. The startable driving force calculation portion calculates a startable driving force that is required to be generated at the motor for starting the electromotive vehicle. The requested driving force determination portion determines whether the requested driving force reaches the startable driving force. When it is not determined using the requested driving force determination portion that the requested driving force reaches the startable driving force, the driving force adjustment portion executes a driving force adjustment in which a driving force equal to the startable driving force is generated at the motor.

In the start support apparatus according to the second aspect, when the requested driving force does not reach the startable driving force, the driving force equal to the startable driving force is generated at the motor. Thus, the electromotive vehicle can start even when the requested driving force does not reach the startable driving force, and the start support apparatus can relieve a feeling of anxiety of the driver at starting the electromotive vehicle.

According to a third aspect of the present invention, a start support apparatus to be disposed in an electromotive vehicle that uses a motor as a travel driving source includes a requested driving force calculation portion, a startable driving force calculation portion, a requested driving force determination portion, and a driving force adjustment portion. The requested driving force calculation portion calculates a requested driving force that is generated at the motor based on operation by a driver of the electromotive vehicle. The startable driving force calculation portion calculates a startable driving force that is required to be generated at the motor for starting the electromotive vehicle. The requested driving force determination portion determines whether the requested driving force reaches the startable driving force. When it is not determined using the requested driving force determination portion that the requested driving force reaches the startable driving force, the driving force adjustment portion executes a driving force adjustment in which a driving force greater than the startable driving force is generated at the motor.

In the start support apparatus according to the third aspect, when the requested driving force does not reach the startable driving force, the driving force greater than the startable driving force is generated at the motor. Thus, the electromotive vehicle can start even when the requested driving force does not reach the startable driving force, and the start support apparatus can relieve a feeling of anxiety of the driver at starting the electromotive vehicle.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
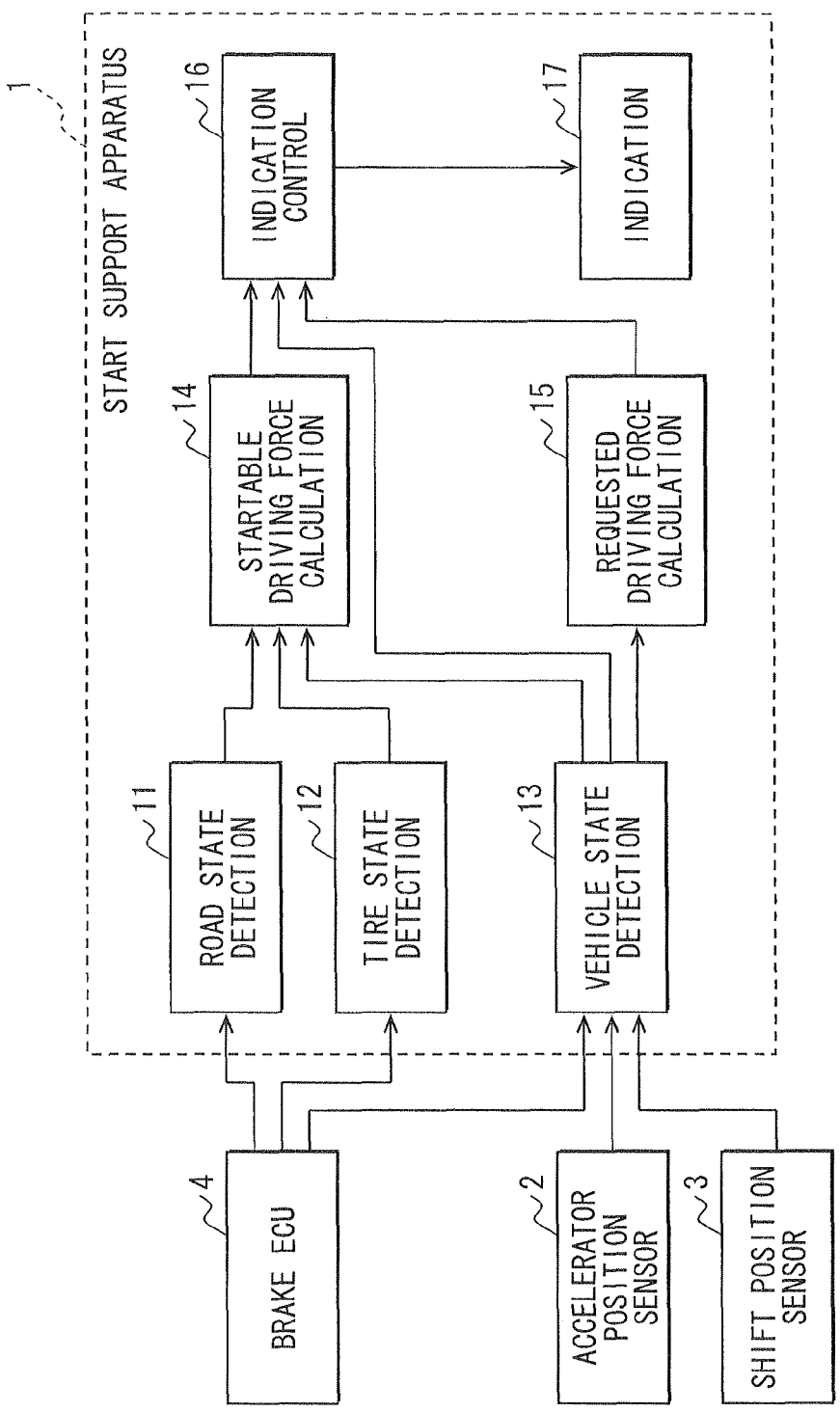
FIG. 1 is a block diagram showing a start support system according to a first embodiment.

A start support system 100 according to a first embodiment of the present disclosure will be described with reference to drawings. As shown in FIG. 1, the start support system 100 is disposed in an electromotive vehicle and includes a start support apparatus 1, an accelerator position sensor 2, a shift position sensor 3, and a brake ECU 4.

The electromotive vehicle may be an electric vehicle (EV) that uses only a motor as a travel driving source and may also be a hybrid electric vehicle (HEV) that uses an internal combustion engine and a motor together as a travel driving source. In the present embodiment, as an example, the start support system 100 is disposed in an electric vehicle with automatic transmission (AT). Hereafter, the vehicle in which the start support system 100 is located is referred to as a subject vehicle.

The accelerator position sensor 2 is a sensor that detects a pressed amount of an accelerator pedal. For example, the accelerator position sensor 2 may includes a stroke sensor.

The shift position sensor 3 detects a shift position and a travel range of the subject vehicle and outputs a signal that indicates the detected shift position. The shift position includes a parking position "P," a reverse position "R," a neutral position "N," a driving position "D," a low position "L" (or first position "1"), and a second position "2."

The brake ECU 4 includes a microcomputer that includes a CPU, ROM, RAM, and a backup RAM. The brake ECU 4 executes various processes related to control of the subject vehicle based on detection values of various sensors. For example, the brake ECU 4 detects an inclination angle of the subject vehicle with respect to a horizontal plane based on detection values of an acceleration sensor that detects accelerations of the subject vehicle in an X-axis direction, a Y-axis direction, and a Z-axis direction. In addition, the brake ECU 4 acquires information about a vehicle speed from a wheel speed sensor that detects the vehicle speed based on a rotation speed of each wheel and acquires information about air pressure of a tire from a tire pressure monitoring system (TPMS) that monitors the air pressure of the tire.

As shown in FIG. 1, the start support apparatus 1 includes a road state detection portion 11, a tire state detection portion 12, a vehicle state detection portion 13, a startable driving force calculation portion 14, a requested driving force calculation portion 15, an indication control portion 16, and an indication portion 17.

The road state detection portion 11 detects a road state such as a road surface resistance and a gradient of a current position of the subject vehicle. For example, the road state detection portion 11 may detect the gradient based on the inclination angle of the subject vehicle detected by the brake ECU 4. The road state detection portion 11 may also detect the gradient based on an inclination angle of the subjected vehicle detected by an inclination sensor which is not shown and may also detect the gradient based on gradient data in map data in a vehicle navigation device which is not shown.

The road state detection portion 11 may detect the road surface resistance, for example, based on infrastructure information including a road surface friction coefficient μ that is acquired by road-to-vehicle communication using a communication device which is not shown. The road state detection portion 11 may determine a state of a road surface such as wet and dry based on a characteristic amount of, for example, brightness of image data of the road surface taken with an imaging device which is not shown. The road state detection portion 11 can operate as a road state information acquisition portion.

The tire state detection portion 12 detects a contact state, such as a contact area and a contact position, between the tire and the road surface. For example, the tire state detection portion 12 may detect the contact area based on the air pressure of the tire detected by the brake ECU 4 using a relationship that the contact area decreases with increase in the air pressure of the tire.

The tire state detection portion 12 may detect presence of an uneven part of a road to get over and a height of the uneven part based on image data of surrounding of the tire taken by an imaging device which is not shown. In the present case, an imaging area of the imaging device is in the vicinity of a portion of the tire coming in contact with the road. In a case where the tire state detection portion 12 detects the presence of an uneven part and a height of the uneven part, the tire state detection portion 12 can detect the presence of the uneven part by a known image recognition and can detect the height of the uneven part by comparing the uneven part with the tire in the image data.

The tire state detection portion 12 may also detect presence of an uneven part to get over and a height of the uneven part by determining a shape of a periphery of the tire based on a distance sensor disposed in the tire and detecting a distance to the periphery of the tire. For example, when the subject vehicle goes forward and the periphery of the tire is drastically depressed at a front side of the tire, the tire state detection portion 12 determines that there is an uneven part to get over. When the subject vehicle goes backward and the periphery of the tire is drastically depressed at a rear side of the tire, the tire state detection portion 12 determines that there is an uneven part to get over. The tire state detection portion 12 may determine the height of the uneven parts based on a distance from a flat portion of the tire being in contact with the road to a portion that is drastically depressed. The tire state detection portion 12 can operate as a contact state information acquisition portion.

The vehicle state detection portion 13 detects a vehicle state such as the shift position, the vehicle speed, and the pressed amount of the accelerator pedal. The vehicle state detection portion 13 detects the shift position by acquiring the detection result of the shift position sensor 3. The vehicle state detection portion 13 detects the vehicle speed by acquiring the information about the vehicle speed from the brake ECU 4. The vehicle state detection portion 13 detects the pressed amount of the accelerator pedal by acquiring the detection result of the accelerator position sensor 2. The vehicle state detection portion 13 can operate as a shift position information acquisition portion.

The startable driving force calculation portion 14 calculates a driving force to generate at the motor for starting the subject vehicle (hereafter, referred to as a startable driving force). A standard value of the startable driving force is determined based on a specification of the subject vehicle such as a weight and a transmission gear ratio. For example, the standard value is fixed for each shift position. The startable driving force calculation portion 14 calculates the startable driving force based on the standard values, the road resistance and the gradient detected by the road state detection portion 11, the contact area and the contact position of the tire detected by the tire state detection portion 12, and the shift position detected by the vehicle state detection portion 13.

The startable driving force calculation portion 14 calculates the startable driving force to be large when the road resistance or the gradient is large and the startable driving force calculation portion 14 calculates the startable driving force to be small when the contact area of the tire is large. In a case where there is an uneven part to get over at the contact portion, the startable driving force calculation portion 14 calculates the startable driving force to be larger compared with a case there is no uneven part. In addition, the startable driving force calculation portion 14 increases the startable driving force with increase in the height of the uneven part. Furthermore, when the shift position is "2," the startable driving force calculation portion 14 calculates the startable driving force to be larger compared with when the shift position is "L."

The startable driving force calculated by the startable driving force calculation portion 14 is an estimate value, and there may be a case where the subject vehicle cannot start even when the startable driving force is generated at the motor. Thus, the startable driving force calculation portion 14 calculates the startable driving force to be large so as to restrict the case where the subject vehicle cannot start.

The requested driving force calculation portion 15 calculates a driving force generated in the motor based on operation by the driver of the subject vehicle (hereafter, referred to as a requested driving force). The requested driving force calculation portion 15 calculates the requested driving force based on the pressed amount of the accelerator pedal detected by the vehicle state detection portion 13. Specifically, the requested driving force calculation portion 15 calculates the requested driving force based on a correspondence relationship between the pressed amount of the accelerator pedal and the requested driving force in which the requested driving force increases with the pressed amount of the accelerator pedal. The correspondence relationship between the pressed amount of the accelerator pedal and the requested driving force may use a known relationship.

The indication control portion 16 executes an indication control process to instruct the indication portion 17 to show a degree of gap between the requested driving force and the startable driving force based on the requested driving force calculated by the requested driving force calculation portion 15 and the startable driving force calculated by the startable driving force calculation portion 14.

For example, the indication portion 17 includes a display device, an audio output device, and a vibration generation device. The display device displays texts and images. The display device may include a liquid crystal display, an organic electroluminescence display, or a plasma display. The display device may be a display of an in-vehicle navigation device, a head-up display (HUD), or a display disposed in a meter panel. The audio output device outputs audio, for example, from a speaker.

The vibration generation device generates vibration with a known oscillator. The vibration generation device is disposed on a member of the subject being in contact with the driver who carries out a start operation of the subject vehicle. The vibration generation device may be disposed in a steering wheel so that the driver who grasps the steering wheel can feel vibration. The vibration generation device may also be disposed in a driver seat so that the driver who sits on the driver seat can feel vibration. The vibration generation device can operate as a stimulus generation portion.

The stimulus generation portion is not limited to the vibration generation device and may also be any device that generates stimulus for causing cutaneous sensation of the driver. For example, the stimulus generation portion may be a local thrust generation element, such as a known artificial muscle element, that generates local thrust so that the driver feels a tactile sensation. The stimulus generation portion may also be an element that generates local stimulus current so that the driver feels a tactile sensation. The stimulus generation portion may also be a thermoelectric element that generates or absorbs heat so that the driver feels a sense of temperature.

Next, an indication control process carried out by the indication control portion 16 will be described. In the indication control process, the indication control portion 16 calculates a gap value between the requested driving force and the startable driving force and instructs the indication portion 17 to show the degree of gap. Thus, the indication control portion 16 can operate as a gap calculation portion.

For example, the indication control portion 16 calculates the gap value by subtracting the startable driving force from the requested driving force and instructs the display device to show the calculated gap value or instructs the audio output device to output audio in accordance with the gap value. When the requested driving force is less than the startable driving force, the indication portion 17 shows a minus value so that the driver can recognize that the driving force is not enough to start the subject vehicle. When the requested driving force is greater than the startable driving force, the indication portion 17 shows a plus value so that the driver can recognize that the driving force exceed the driving force to start the subject vehicle. The indication control portion 16 may also calculate the gap value by subtracting the requested driving force from the startable driving force.

The calculated gap value may be classified into a plurality of levels based on the value, and the indication portion 17 may show the level. Also in the present case, the indication portion 17 may show a minus level when the requested driving force is less than the startable driving force and may show a plus level when the requested driving force is greater than the startable driving force. The value and the level of the gap may be expressed with vibration generated by the vibration generation device. For example, the vibration is decreased with increase in the gap value and the vibration is increased with decrease in the gap value.

The calculated gap may also be replaced with a difference in accelerator open degree, and the indication portion 17 may show the difference in accelerator open degree by display or audio output. Thus, the indication control portion 16 can also operate as a conversion portion. The accelerator open degree is a pressed ratio of the accelerator. The accelerator open degree is 0 when the accelerator pedal is not pressed and the accelerator open degree is 100 when the accelerator pedal is pressed at a maximum.

For example, a table in which a pressed ratio of the accelerator pedal required for filling the gap between the startable driving force and the requested driving force is associated with the difference in accelerator open degree may be previously stored in a nonvolatile memory (not shown) in the start support apparatus 1. The indication control portion 16 calculates the difference in accelerator open degree corresponding to the calculated gap value with reference to the table. The indication portion 17 may show the pressed ratio of the accelerator corresponding to the difference in accelerator open degree with the display device and the audio output device.

A method of showing the degree of gap between the requested driving force and the startable driving force is not limited to show the calculated gap value. For example, an indication that expresses the requested driving force calculated by the requested driving force calculation portion 15 and an indication that expresses the startable driving force calculated by the startable driving force calculation portion 14 may be displayed side-by-side so as to be comparable.

Figure 2A:
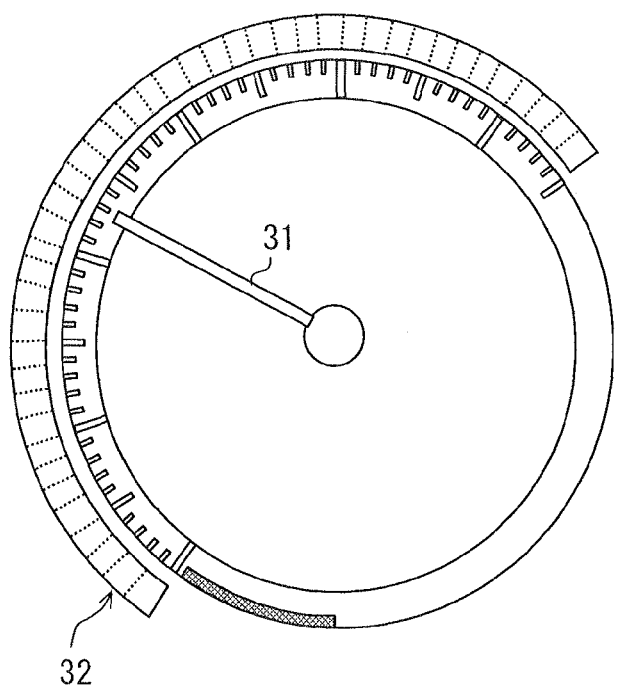
FIG. 2A and FIG. 2B are diagrams showing examples of an indication portion that indicates a degree of gap between a requested driving force and a startable driving force.
Figure 2B:
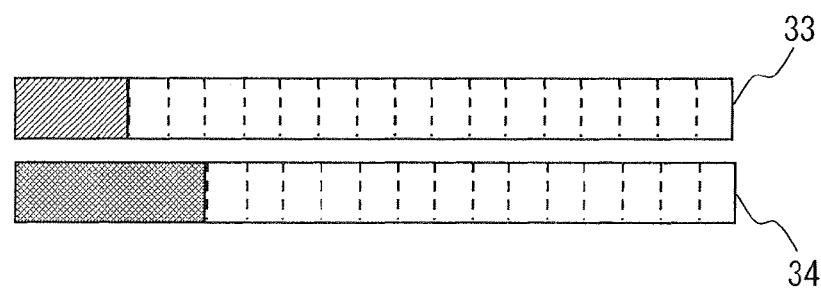

Examples of the above-described configurations are shown in FIG. 2A and FIG. 2B.

In the example in FIG. 2A, the indication portion 17 includes an indicator 31 of a power meter and a gage 32 that shows the value of the startable driving force. The indicator 31 shows the value of the requested driving force by an indication angle. The gage 32 extends along a circumferential direction of a rotation direction of the indicator 31 so that the degree of gap between the requested driving force and the startable driving force can be comparable. The driver can approach the request driving force to the startable driving force by comparing the indicator 31 of the power meter and the gage 32 and controlling the pressed amount of the accelerator pedal so that the indicator 31 of the power meter corresponds to the value of the gage 32.

In the example in FIG. 2B, the indication portion 17 includes a gage 33 that shows the value of the requested driving force and a gage 34 that shows the value of the startable driving force so that the degree of gap between the requested driving force and the startable driving force can be comparable. The driver can approach the request driving force to the startable driving force by comparing the gage 33 and the gage 34 and controlling the pressed amount of the accelerator pedal so that the value of the gage 33 corresponds to the value of the gage 34. The gages 33, 34 may have linear shapes, and the gages 33, 34 may also have curved shapes.

The indication control portion 16 may determine whether the request driving force reaches the startable driving force based on the requested driving force calculated by the requested driving force calculation portion 15 and the startable driving force calculated by the startable driving force calculation portion 14, and the indication control portion 16 may execute a determination indication process in which whether the requested driving force reaches the startable driving force is shown. Thus, the indication control portion 16 can also operate as a requested driving force determination portion.

The indication control portion 16 may determine that the requested driving force does not reach the startable driving force when difference calculated by subtracting the startable driving force from the requested driving force is less than 0, and the indication control portion 16 may determine that the requested driving force reaches the startable driving force when the difference is greater than or equal to 0. The indication portion 17 may show whether the requested driving force reaches the startable driving force by displaying a text or an icon or reading out a text.

The indication control portion 16 may acquire a driving force generated at the motor when the accelerator open degree is maximum (hereafter, referred to as a maximum driving force) and the startable driving force calculated by the startable driving force calculation portion 14 and may determine whether the maximum driving force reaches the startable driving force. Then, when the indication control portion 16 determines that the maximum driving force does not reach the startable driving force, the indication control portion 16 may execute a shift change indication process to recommend the driver to change the shift position. Thus, the indication control portion 16 can also operate as a maximum driving force determination portion.

With regard to the maximum driving force, an actual value or a theoretical value of the maximum driving force may be previously stored in a nonvolatile memory (not shown) in the start support apparatus 1 and the indication control portion 16 may read the value. The indication control portion 16 may determine that the maximum driving force does not reach the startable driving force when difference calculated by subtracting the startable driving force from the maximum driving force is less than 0, and the indication control portion 16 may determine that the maximum driving force reaches the startable driving force when the difference is greater than or equal to 0.

The indication portion 17 may show a recommendation to change the shift position by displaying a text or an icon or reading out a text. The indication portion 17 may recommend the driver only to change the shift position and may also recommend the driver to shift down from the current shift position.

Accordingly, when the subject vehicle cannot start in the current state, the indication control portion 16 instructs the indication portion 17 to show the recommendation to change the shift position, and the subject vehicle can be a startable state. For example, when the driver tries to start the subject vehicle in a state where the shift position is "2" to avoid sudden starting and the subject vehicle cannot start at the current shift position, the indication control portion 16 instructs the indication portion 17 to show the recommendation to change the shift position into "L" so that the subject vehicle can be the startable state.

Figure 3:
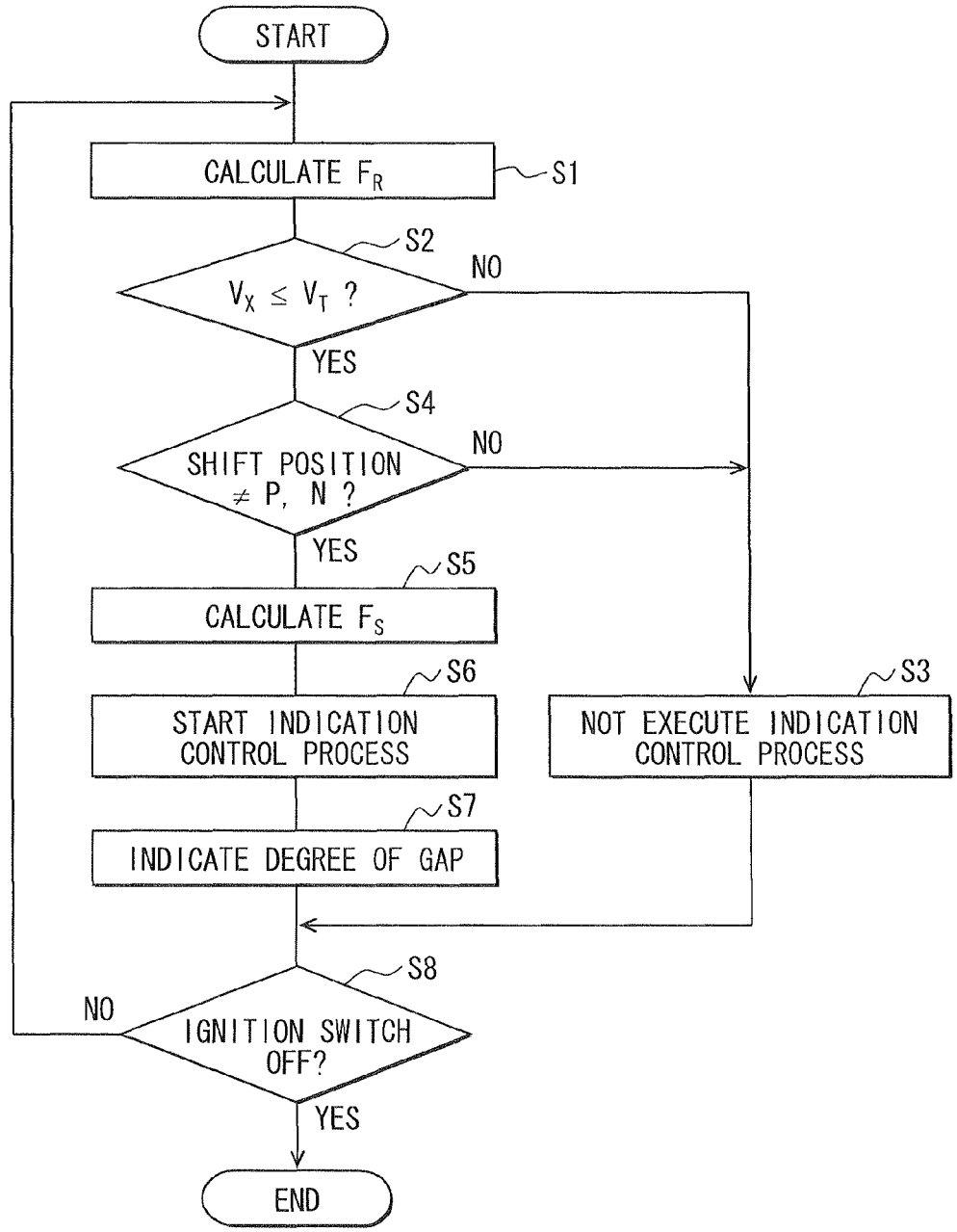
FIG. 3 is a flowchart showing a process related to an indication control process executed by a start support apparatus according to the first embodiment.

Next a process related to the indication control process executed by the start support apparatus 1 will be described. The start support apparatus 1 starts the process shown in FIG. 3 when an ignition switch of the subject vehicle is turned on.

At S1, the requested driving force calculation portion 15 calculates the requested driving force ($F_R$). At S2, the indication control portion 16 determines whether the vehicle speed ($V_X$) detected by the vehicle state detection portion 13 is less than or equal to a predetermined speed ($V_T$). The predetermined speed ($V_T$) is an index for discriminating whether the subject vehicle has already started and can be set optionally. For example, the predetermined speed ($V_T$) may be a vehicle speed corresponding to a detection limit (for example, 5 km/h) of the wheel speed sensor.

If the indication control portion 16 determines that the vehicle speed ($V_X$) is less than or equal to the predetermined speed ($V_T$), which corresponds to "YES" at S2, the indication control portion 16 determines that the subject vehicle has not started yet and the process proceeds to S4. If the indication control portion 16 determines that the vehicle speed ($V_X$) is greater than the predetermined speed ($V_T$), which corresponds to "NO" at S2, the indication control portion 16 determines that the subject vehicle has already started, and the process proceeds to S3. At S3, the indication control portion 16 does not execute the indication process and the process proceeds to S8.

At S4, the indication control portion 16 determines whether the shift position is other than "P" and "N" based on the shift position detected by the vehicle state detection portion 13. If the indication control portion 16 determines that the shift position is other than "P" and "N," which corresponds to "YES" at S4, the indication control portion 16 determines that the driver wants to move the subject vehicle forward or backward, and the process proceeds to S5. If the indication control portion 16 does not determine that the shift position is other than "P" and "N," that is, if the shift position is "P" or "N," which corresponds to "NO" at S4, the indication control portion 16 determines that the driver does not want to move the subject vehicle forward or backward, and the process proceeds to S3.

At S5, the startable driving force calculation portion 14 calculates the startable driving force ($F_S$) and the process proceeds to the S6. At S6, the indication control portion 16 executes the indication control process based on the requested driving force ($F_R$) calculated at S1 and the startable driving force ($F_S$) calculated at S5, and the process proceeds to S7. At S7, the indication portion 17 indicates the degree of gap between the requested driving force ($F_R$) calculated at S1 and the startable driving force ($F_S$) calculated at S5, and the process proceeds to S8. The indication control portion 16 may execute the determination indication process and the shift change indication process.

At S8, the start support apparatus 1 determines whether the ignition switch is turned off. If the ignition switch is turned off, which corresponds to "YES" at S8, the process ends. If the ignition switch is not turned off, which corresponds to "NO" at S8, the process returns to S1 and the above-described flow is repeated.

Because the start support apparatus 1 according to the present embodiment indicates the degree of gap between the requested driving force and the startable driving force, even a driver who is unfamiliar with an electromotive vehicle can easily determine how much driving force needs to be generated to start the subject vehicle. Thus, the start support apparatus 1 can relieve a feeling of anxiety of a driver at starting an electromotive vehicle.

Second Embodiment

Figure 4:
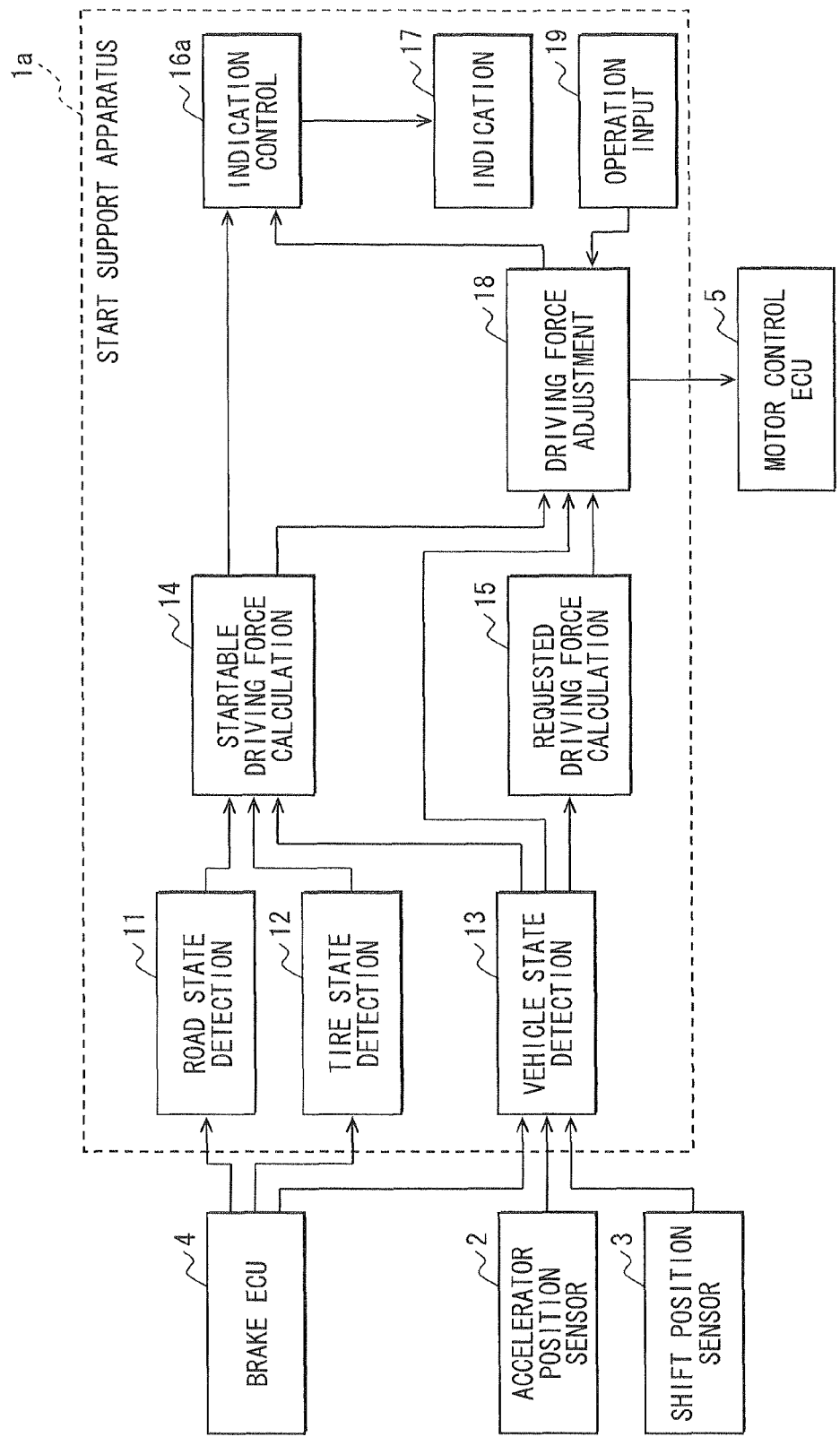
FIG. 4 is a block diagram showing a start support system according to a second embodiment.

A start support system 200 according to a second embodiment of the present disclosure will be described with reference to the drawings. As shown in FIG. 4, the start support system 200 is disposed in an electromotive vehicle and includes a start support apparatus 1a, an accelerator position sensor 2, a shift position sensor 3, a brake ECU 4, and a motor control ECU 5.

The motor control ECU 5 includes a microcomputer that includes a CPU, ROM, RAM, and a backup RAM. For example, the motor control ECU 5 controls a motor by activating an inverter based on an instruction from the start support apparatus 1a.

The start support apparatus 1a includes a road state detection portion 11, a tire state detection portion 12, a vehicle state detection portion 13, a startable driving force calculation portion 14, a requested driving force calculation portion 15, an indication control portion 16a, an indication portion 17, a driving force adjustment portion 18, and an operation input portion 19.

The driving force adjustment portion 18 executes an driving force adjustment process in which a driving force generated at a motor is automatically adjusted based on the requested driving force calculated by the requested driving force calculation portion 15 and the startable driving force calculated by the startable driving force calculation portion 14. The driving force adjustment portion 18 may be configured to determine whether the requested driving force reaches the startable driving force and to instruct the motor control ECU 5 to generate a driving force equal to the startable driving force at the motor when the requested force does not reach the startable driving force. Thus, the driving force adjustment portion 18 can operate as a requested driving force determination portion and a driving force adjustment portion. The driving force adjustment portion 18 can determine whether the requested driving force reaches the startable driving force in a manner similar to the indication control portion 16.

The driving force adjustment portion 18 may also be configured to determine whether the requested driving force exceeds the startable driving force and to instruct the motor control ECU 5 to generate a driving force equal to the startable driving force at the motor when the requested force does not reach the startable driving force. Thus, the driving force adjustment portion 18 can also operate as an excess determination portion. Accordingly, even when the requested driving force is greater than necessary, the motor is less likely to generate a wasteful driving force.

The driving force adjustment portion 18 may determine that the requested driving force exceeds the startable driving force when difference calculated by subtracting the startable driving force from the requested driving force is greater than 0, and the driving force adjustment portion 18 may determine that the requested driving force does not exceed the startable driving force when the difference is less than or equal to 0.

The driving force adjustment portion 18 may also be configured to instruct the motor control ECU 5 to generate a driving force equal to the requested driving force at the motor when the requested force exceeds the startable driving force. In the following description about the driving force adjustment process, as an example, the driving force adjustment portion 18 instructs the motor control ECU 5 to generate the driving force equal to the startable driving force at the motor when the requested driving force does not reach the startable driving force and the driving force adjustment portion 18 instructs the motor control ECU 5 to generate the driving force equal to the requested driving force at the motor when the requested driving force exceeds the startable driving force.

When the driving force adjustment portion 18 instructs the motor control ECU 5 to generate the driving force equal to the startable driving force, the driving force adjustment portion 18 may instruct in such a manner that the driving force is increased to the startable driving force in stages, and then the driving force is decreased in stages.

For example, the driving force adjustment portion 18 calculates driving forces to generate at the motor in stages and successively instructs the motor control ECU 5 to successively generate the calculated driving force so that the driving force is increased to the startable driving force in stages, and then the driving force is decreased in stages. The driving force may be changed linearly and the driving force may also be changed in a curved manner.

Figure 5:
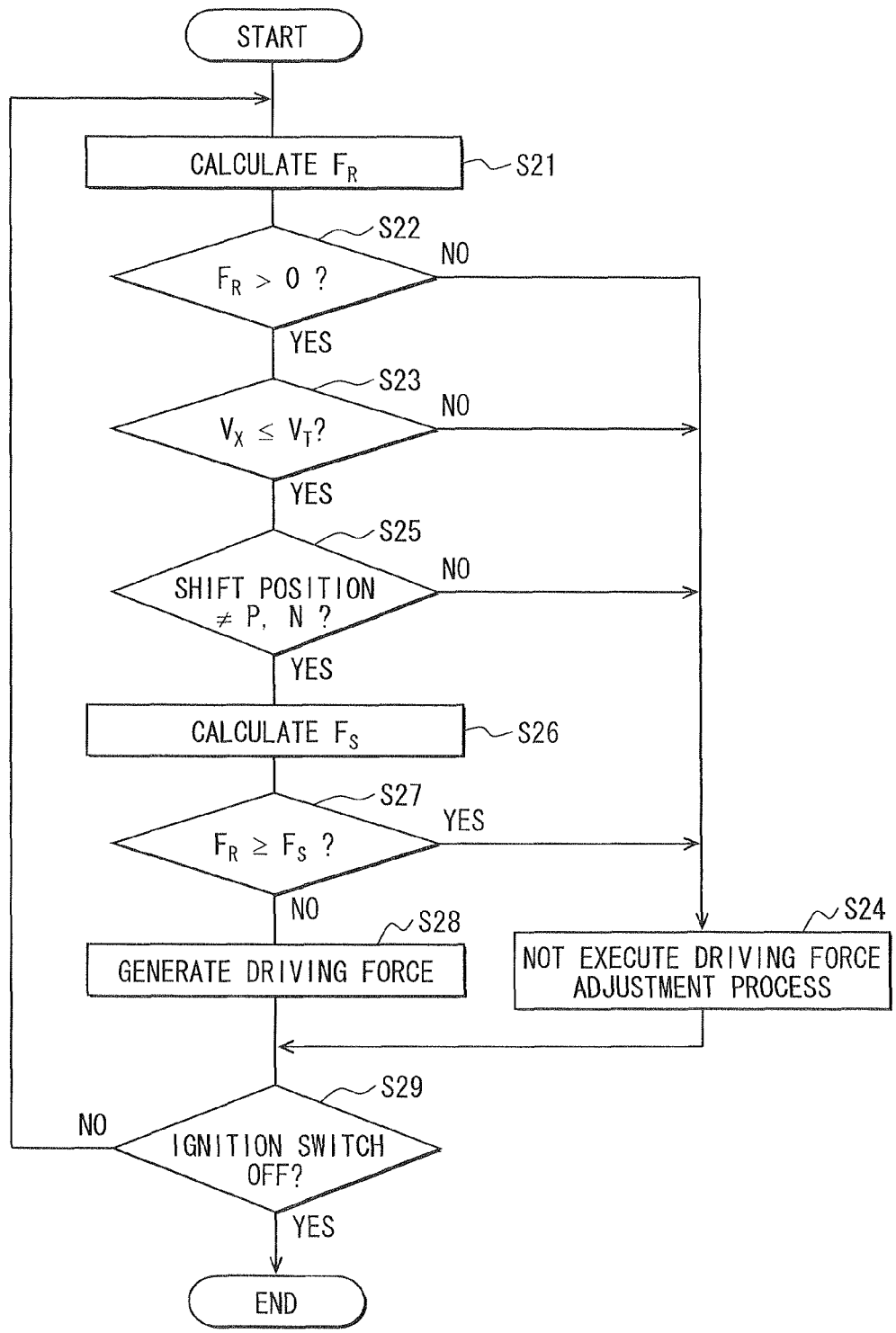
FIG. 5 is a flowchart showing a process related to a driving force adjustment process executed by a start support apparatus according to the second embodiment.

A process related to the driving force adjustment process executed by the start support apparatus 1a will be described. The start support apparatus 1a starts the process shown in FIG. 5 when an ignition switch of the subject vehicle is turned on.

At S21, the requested driving force calculation portion 15 calculates the requested driving force ($F_R$). At S22, the driving force adjustment portion 18 determines whether the requested driving force calculated at S21 is greater than 0. If the driving force adjustment portion 18 determines that the requested driving force is greater than 0, which corresponds to "YES" at S22, the process proceeds to S23. If the driving force adjustment portion 18 determines that the requested driving force is less than or equal to 0, which corresponds to "NO" at S22, the process proceeds to the S24.

At S23, the driving force adjustment portion 18 determines whether the vehicle speed ($V_X$) detected by the vehicle state detection portion 13 is less than or equal to a predetermined speed ($V_T$). The predetermined speed ($V_T$) is an index for discriminating whether the subject vehicle has already started and can be set optionally. For example, the predetermined speed ($V_T$) may be a vehicle speed corresponding to a detection limit (for example, 5 km/h) of the wheel speed sensor.

If the driving force adjustment portion 18 determines that the vehicle speed ($V_X$) is less than or equal to the predetermined speed ($V_T$), which corresponds to "YES" at S23, the driving force adjustment portion 18 determines that the subject vehicle has not started yet and the process proceeds to S24. If the driving force adjustment portion 18 determines that the vehicle speed ($V_X$) is greater than the predetermined speed ($V_T$), which corresponds to "NO" at S23, the driving force adjustment portion 18 determines that the subject vehicle has already started, and the process proceeds to S24. At S24, the driving force adjustment portion 18 does not execute the driving force adjustment process and the process proceeds to S29. In other words, the driving force adjustment portion 18 instructs the motor control ECU 5 to generate the driving force equal to the requested driving force calculated at S21 at the motor.

At S25, the driving force adjustment portion 18 determines whether the shift position is other than "P" and "N" based on the shift position detected by the vehicle state detection portion 13. If the driving force adjustment portion 18 determines that the shift position is other than "P" and "N," which corresponds to "YES" at S25, the driving force adjustment portion 18 determines that the driver wants to move the subject vehicle forward or backward, and the process proceeds to S26. If the driving force adjustment portion 18 does not determine that the shift position is other than "P" and "N," that is, if the shift position is "P" or "N," which corresponds to "NO" at S25, the driving force adjustment portion 18 determines that the driver does not want to move the subject vehicle forward or backward, and the process proceeds to S24.

At S26, the startable driving force calculation portion 14 calculates the startable driving force ($F_S$) and the process proceeds to the S27. At S27, the driving force adjustment portion 18 determines whether the requested driving force ($F_R$) calculated at S21 reaches the startable driving force ($F_S$) calculated at S26. If the driving force adjustment portion 18 determines that the requested driving force ($F_R$) reaches the startable driving force ($F_S$), which corresponds to "YES" at S27, the process proceeds to S24. If the driving force adjustment portion 18 does not determine that the requested driving force ($F_R$) reaches the startable driving force ($F_S$), that is, if the requested driving force ($F_R$) is less than the startable driving force ($F_S$), which corresponds to "NO" at S27, the process proceeds to S28.

At S28, the driving force adjustment portion 18 instructs the motor control ECU 5 to generate the driving force equal to the startable driving force calculated at S26 at the motor, and the process proceeds to S29.

At S29, the start support apparatus 1a determines whether the ignition switch is turned off. If the ignition switch is turned off, which corresponds to "YES" at S29, the process ends. If the ignition switch is not turned off, which corresponds to "NO" at S29, the process returns to S21 and the above-described flow is repeated.

In the start support apparatus 1a according to the present embodiment, if the requested driving force does not reach the startable driving force, the driving force equal to the startable driving force is generated at the motor. Thus, the subject vehicle can start even when the requested driving force does not reach the startable driving force, and the start support apparatus 1a can relieve a feeling of anxiety of a driver at starting an electromotive vehicle.

In addition, because the driving force is increased to the startable driving force in stages and then the startable driving force is decreased in stages, a sudden acceleration at starting and a sudden deceleration after starting can be restricted.

With reference to FIG. 4, when the driving force generated at the motor is changed in stages by the driving force adjustment portion 18, the indication control portion 16a successively acquire the values of the driving force successively generated at the motor based on the value of each driving force calculated at the driving force adjustment portion 18. Then, the indication control portion 16a instructs the indication portion 17 to show a degree of gap between the acquired driving force which is changed in stages (hereafter, referred to as a changing driving force) and the startable deriving force. Thus, the indication control portion 16a can operate as a changing driving force acquisition portion.

The indication control portion 16a may instruct the indication portion 17 to show the degree of gap between the changing driving force and the startable driving force in a manner similar to the indication control portion 16 that instructs the indication portion 17 to show the degree of gap between the requested driving force and the startable driving force. In other words, the indication control portion 16a executes an indication control process to show the degree of gap between the changing driving force and the startable driving force instead of the degree of gap between the requested driving force and the startable driving force.

The indication control portion 16a may execute a shift change indication process in which the indication control portion 16a determines whether the maximum driving force reaches the startable driving force calculated by the startable driving force calculation portion 14 and recommends a driver to change the shift position when the indication control portion 16a determines that the maximum driving force does not reach the startable driving force. Thus, the indication control portion 16a can also operate as a maximum driving force determination portion. Accordingly, when the subject vehicle cannot start in the current shift position, the indication control portion 16a can recommend the driver to change the shift position so that the subject vehicle can be a startable state.

The operation input portion 19 is a switch with which a driver selects necessity of the driving force adjustment. For example, the operation input portion 19 includes a mechanical switch that is changed between an on-state and an off-state based on operation by the driver. When the switch is in the on-state, the operation input portion 19 outputs a signal that indicates the on-state to the driving force adjustment portion 18. When the switch is in the off-state, the operation input portion 19 outputs a signal that indicates the off-state to the driving force adjustment portion 18.

The driving force adjustment portion 18 executes the driving force adjustment process when the signal that indicates the on-state is input, and the driving force adjustment portion 18 does not execute the driving force adjustment process when the signal that indicates the off-state is input. Thus, the operation input portion 19 can operate as a selection portion. For example, when the signal that indicates the off-state is input and the driving force adjustment portion 18 does not execute the driving force adjustment process, the degree of gap between the requested driving force and the startable driving force may be indicated in a manner similar to the start support apparatus 1 according to the first embodiment. Accordingly, the driving force adjustment portion 18 can execute the driving force adjustment process according to preference of a driver.

Other Embodiments

Although the present disclosure has been fully described in connection with the above-described embodiments thereof with reference to the accompanying drawings, it is to be noted that various changes and modifications will become apparent to those skilled in the art.

In the second embodiment, the driving force adjustment portion 18 instructs the motor control ECU 5 to generate the driving force equal to the startable driving force at the motor when the requested driving force does not reach the startable driving force. However, the instruction of the driving force adjustment portion 18 is not limited to the above-described example. For example, when the requested driving force does not reach the startable driving force, the driving force adjustment portion 18 may instruct the motor control ECU 5 to generate an adjusted driving force greater than the startable driving force. For example, the adjusted driving force can be calculated by adding a gap value between the startable driving force and the requested driving force to the startable driving force.

The driving force adjustment portion 18 may also determine whether the requested driving force exceeds the startable driving force by a predetermined value or more. If the requested driving force exceeds the startable driving force by the predetermined value or more, the driving force adjustment portion 18 may instruct the motor control ECU 5 to generate an adjusted driving force that is greater than the startable driving force and less than a driving force calculated by adding the predetermined value to the startable driving force. The predetermined value can be determined optionally.

When the requested driving force exceeds the startable driving force by the predetermined value or more, the driving force adjustment portion 18 may also instruct the motor control ECU 5 to generate a driving force equal to the request driving force.

When the driving force adjustment portion 18 instructs the motor control ECU 5 to generate the adjusted driving force at the motor, the driving force generated at the motor may be increased to the adjusted driving force in stages and then the driving force may be decreased in stages.

When the driving force generated at the motor is gradually changed, the indication control portion 16a may instruct the indication portion 17 to indicate the degree of gap between the changing driving force and the startable driving force as described above.

In the above-described embodiments, each of the start support system 100 and the start support system 200 is applied to an electromotive vehicle with automatic transmission (AT). The present disclosure may also be applied to an electromotive vehicle with manual transmission (MT).

While the invention has been described with reference to the above-described embodiments thereof, it is to be understood that the invention is not limited to the above-described embodiments and constructions. The invention is intended to cover various modification and equivalent arrangements. In addition, other combinations of technical means described in the above-described embodiments are also included in the invention within a scope of claims.

What is claimed is:

1. A start support apparatus to be disposed in an electromotive vehicle that uses a motor as a travel driving source, comprising:
   a requested driving force calculation portion configured to calculate a requested driving force that is generated at the motor based on operation by a driver of the electromotive vehicle;
   a road state information acquisition portion configured to acquire information about at least one of a road surface resistance and a gradient of a current position of the electromotive vehicle;
   a startable driving force calculation portion, including a microcomputer, configured to calculate a startable driving force that is required to be generated at the motor for starting the electromotive vehicle from a state where the electromotive vehicle has stopped, wherein the startable driving force calculation portion is configured to calculate the startable driving force based on the information acquired by the road state information acquisition portion; and
   a display device, including a display, configured to show a degree of gap between the requested driving force and the startable driving force.

2. The start support apparatus according to claim 1, further comprising:
   a contact state information acquisition portion configured to acquire information about a contact state between a tire of the electromotive vehicle and a road surface,
   wherein the startable driving force calculation portion calculates the startable driving force based on the information about the contact state acquired by the contact state information acquisition portion.

3. The start support apparatus according to claim 1, further comprising:
   a shift position information acquisition portion configured to acquire information about a shift position of the electromotive vehicle,
   wherein the startable driving force calculation portion calculates the startable driving force based on the shift position information acquired by the shift position information acquisition portion.

4. The start support apparatus according to claim 1, further comprising:
   a requested driving force determination portion configured to determine whether the requested driving force reaches the startable driving force,
   wherein the display device shows that the requested driving force does not reach the startable driving force when the requested driving force determination portion does not determine that the request driving force reaches the startable driving force, and the display device shows that the requested driving force reaches the startable driving force when the requested driving force determination portion determines that the requested driving force reaches the startable driving force.

5. The start support apparatus according to claim 3, further comprising:
a maximum driving force determination portion configured to determine whether a maximum driving force that is generated at the motor when an accelerator open degree of the electromotive vehicle is maximum reaches the startable driving force,
wherein when the maximum driving force determination portion determines that the maximum driving force does not reach the startable driving force, the display device shows a recommendation to change the shift position.

6. The start support apparatus according to claim 1, wherein
the display device shows the degree of gap between the requested driving force and the startable driving force by displaying an indication that expresses the requested driving force and an indication that expresses the startable driving force side-by-side so as to be comparable via the display.

7. The start support apparatus according to claim 1, further comprising:
a gap calculation portion configured to calculate a gap value between the requested driving force and the startable driving force,
wherein the display device displays the gap value calculated by the gap calculation portion via the display.

8. The start support apparatus according to claim 7,
wherein the display device outputs audio in accordance with the gap value calculated by the gap calculation portion.

9. The start support apparatus according to claim 7,
wherein the display device includes a stimulus generation portion disposed in a member of the electromotive vehicle that comes in contact with the driver, and
wherein the stimulus generation portion is configured to generate a stimulus that causes a cutaneous sensation of the driver in accordance with the gap value calculated by the gap calculation portion.

10. The start support apparatus according to claim 1, further comprising:
a gap calculation portion configured to calculate a gap value between the requested driving force and the startable driving force; and
a conversion portion configured to convert the gap value calculated by the gap calculation portion into a difference in accelerator open degree of the electromotive vehicle;
wherein the display device shows the difference in accelerator open degree by display via the display or wherein an audio output indicates the difference in accelerator open degree.

11. A start support system to be disposed in an electromotive vehicle that uses a motor as a travel driving source, comprising:
a requested driving force calculation portion configured to calculate a requested driving force that is generated at the motor based on operation by a driver of the electromotive vehicle;
a road state information acquisition portion configured to acquire information about at least one of a road surface resistance and a gradient of a current position of the electromotive vehicle;
a startable driving force calculation portion configured to calculate a startable driving force that is required to be generated at the motor for starting the electromotive vehicle from a state where the electromotive vehicle has stopped, wherein the startable driving force calculation portion is configured to calculate the startable driving force based on the information acquired by the road state information acquisition portion;
a requested driving force determination portion configured to determine whether the requested driving force reaches the startable driving force;
a driving force adjustment portion; and
a electronic control unit configured to control the motor based on output from the driving force adjustment portion, the electronic control unit comprising at least a computer processor and a computer readable storage medium,
wherein when the requested driving force determination portion does not determine that the requested driving force reaches the startable driving force, the driving force adjustment portion executes a driving force adjustment in which a driving force equal to the startable driving force is generated at the motor.

12. The start support system according to claim 11, further comprising:
an excess determination portion configured to determine whether the requested driving force exceeds the startable driving force,
wherein when the excess determination portion determines that the requested driving force exceeds the startable driving force, the driving force adjustment portion executes the driving force adjustment in which a driving force equal to the startable driving force is generate at the motor.

13. The start support system according to claim 11,
wherein when the driving force adjustment portion executes the driving force adjustment in which the driving force equal to the startable driving force is generated, the driving force adjustment portion increases the driving force to the startable driving force in stages and then decreases the driving force in stages.

14. The start support system according to claim 13, further comprising:
a changing driving force acquisition portion configured to successively acquire the driving force generated at the motor when the driving force adjustment portion increases the driving force to the startable driving force in stages and then decreases the driving force in stages; and
an indication portion configured to show a degree of gap between the driving force successively acquired by the changing driving force acquisition portion and the startable driving force.

15. The start support system according to claim 11, further comprising:
a shift position information acquisition portion configured to acquire information about a shift position of the electromotive vehicle;
a maximum driving force determination portion configured to determine whether a maximum driving force that is generated at the motor when an accelerator open degree of the electromotive vehicle is maximum reaches the startable driving force; and an indication portion, wherein the startable driving force calculation portion calculates the startable driving force based on the shift position information acquired by the shift position information acquisition portion, and wherein when the maximum driving force determination portion does not determine that the maximum driving force reaches the startable driving force, the indication portion shows a recommendation to change the shift position.

16. The start support system according to claim 11, further comprising:

a selection portion configured to be operated by the driver to select a necessity of the driving force adjustment, wherein the driving force adjustment portion executes the driving force adjustment when the selection portion is operated to require the driving force adjustment, and the driving force adjustment portion does not execute the driving force adjustment when the selection portion is operated not to require the driving force adjustment.

17. A start support system to be disposed in an electromotive vehicle that uses a motor as a travel driving source, comprising:

a requested driving force calculation portion configured to calculate a requested driving force that is generated at the motor based on operation by a driver of the electromotive vehicle;

a road state information acquisition portion configured to acquire information about at least one of a road surface resistance and a gradient of a current position of the electromotive vehicle;

a startable driving force calculation portion configured to calculate a startable driving force that is required to be generated at the motor for starting the electromotive vehicle from a state where the electromotive vehicle has stopped, wherein the startable driving force calculation portion is configured to calculate the startable driving force based on the information acquired by the road state information acquisition portion;

a requested driving force determination portion configured to determine whether the requested driving force reaches the startable driving force;

a driving force adjustment portion; and a electronic control unit configured to control the motor based on output from the driving force adjustment portion, the electronic control unit comprising at least a computer processor and a computer readable storage medium, wherein when the requested driving force determination portion does not determine that the requested driving force reaches the startable driving force, the driving force adjustment portion executes a driving force adjustment in which a driving force greater than the startable driving force is generated at the motor.

18. The start support system according to claim 17, further comprising:

a shift position information acquisition portion configured to acquire information about a shift position of the electromotive vehicle;

a maximum driving force determination portion configured to determine whether a maximum driving force that is generated at the motor when an accelerator open degree of the electromotive vehicle is maximum reaches the startable driving force; and an indication portion, wherein the startable driving force calculation portion calculates the startable driving force based on the shift position information acquired by the shift position information acquisition portion, and wherein when the maximum driving force determination portion does not determine that the maximum driving force reaches the startable driving force, the indication portion shows a recommendation to change the shift position.

19. The start support system according to claim 17, further comprising:

a selection portion configured to be operated by the driver to select a necessity of the driving force adjustment, wherein the driving force adjustment portion executes the driving force adjustment when the selection portion is operated to require the driving force adjustment, and the driving force adjustment portion does not execute the driving force adjustment when the selection portion is operated not to require the driving force adjustment.

* * * * *